Oct. 19, 1937. H. B. SUHR 2,096,266
NEW BORATE COMPOUND AND METHOD OF PREPARING SAME
Filed Feb. 8, 1935 4 Sheets—Sheet 1

Inventor
Henry Bruno Suhr
By Lyon & Lyon
Attorneys

Oct. 19, 1937. H. B. SUHR 2,096,266
NEW BORATE COMPOUND AND METHOD OF PREPARING SAME
Filed Feb. 8, 1935 4 Sheets-Sheet 3

Patented Oct. 19, 1937

2,096,266

UNITED STATES PATENT OFFICE 2,096,266

NEW BORATE COMPOUND AND METHOD OF PREPARING SAME

Henry Bruno Suhr, Trona, Calif., assignor to American Potash & Chemical Corporation, Trona, Calif., a corporation of Delaware Application February 8, 1935, Serial No. 5,539

12 Claims. (Cl. 23—59)

This invention relates to a new borate compound and to the method of preparing same.

I have discovered that there can be formed a new sodium borate compound which contains three molecules of sodium oxide ($Na_2O$) and eight molecules of boric oxide ($B_2O_3$) with ten molecules of water of crystallization. The probable formula of this compound is $$3Na_2O.8B_2O_3.10H_2O \text{ or } Na_6B_{16}O_{27}.10H_2O$$

This new borate thus contains a ratio of $Na_2O$ to $B_2O_3$ which lies between the corresponding ratio for the tetraborate, $Na_2B_4O_7$, and the pentaborate, $Na_2B_{10}O_{16}$, which latter are well known compounds. Heretofore, it has been considered that there existed only one sodium borate, namely $Na_4B_{10}O_{17}.5H_2O$, between the tetraborate and the pentaborate. This sodium borate is reported by V. Auger (Comptes Rendu, 180, p. 1603) to be formed at temperatures in the neighborhood of the boiling point of water and has not been reported as existing in contact with solutions at lower temperatures. The various solubility diagrams of the system $Na_2O$—$B_2O_3$—$H_2O$ at temperatures of 30° C. and 60° C., for example, (Inorganic and Theoretical Chemistry, by J. W. Mellor, vol. V, page 67) show only pentaborate as a solid phase between tetraborate and boric acid. I have found, however, that there exists an additional stable solid phase, namely $$Na_6B_{16}O_{27}.10H_2O$$

This new compound possesses considerable value in the glass and enamel industries due to its high boric oxide content. It is a general practice in many glass and enamel batches to utilize mixtures of sodium tetraborate or borax and boric acid to supply the boric oxide content when it is desired to do so without too greatly increasing the sodium oxide content. By using my new compound the desired boric oxide content may be supplied while maintaining the sodium oxide suitably low. This new compound is also an excellent water softener and may be incorporated to advantage in detergents.

It is, therefore, an object of this invention to provide a new sodium borate compound which possesses value for use in various industries.

It is my belief that this new borate compound has not been previously discovered, because (1) it has a very slow rate of crystal growth, and (2) at the temperatures and conditions of concentration at which this new compound exists as a stable phase other sodium borate compounds tend to precipitate unless special technique is utilized to cause a precipitation of this new borate, which is a real stable compound. For this reason, difficulty is encountered in preparing the new compound by crystallizing it from the solution.

It is, therefore, another object of this invention to provide a method by which this new borate compound may be crystallized from a solution.

The present invention, together with various additional objects and advantages thereof will best be understood from a description of the preferred compound, and a preferred process or processes for producing said compound. For this reason, I have hereinafter described, with reference to the accompanying drawings, a preferred process or processes for producing the compound.

the concentration of sodium chloride, however, does not appear on the diagram, the data therefor being listed separately.

Figure 1:
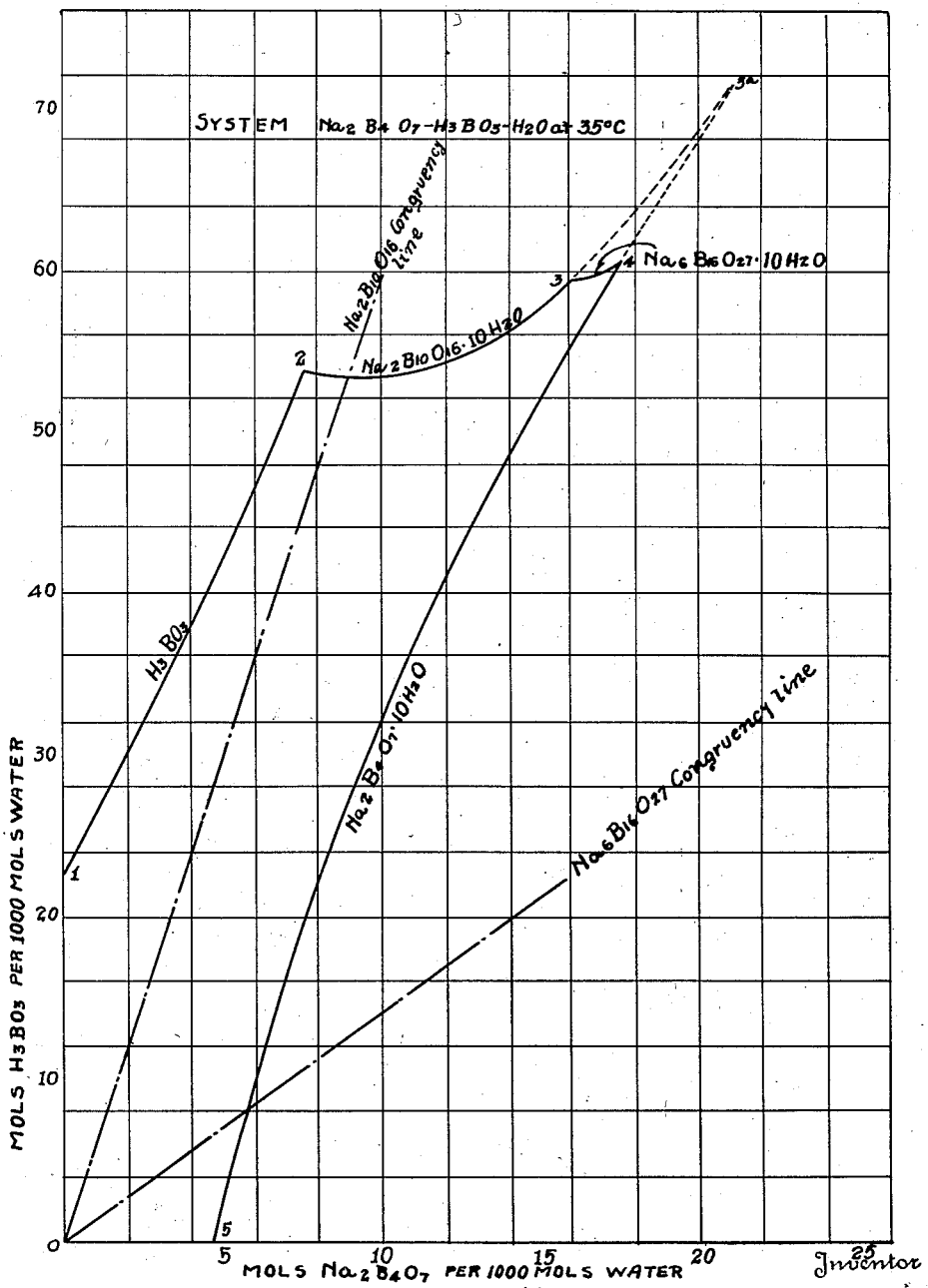
Figure 1 is a solubility diagram of the system $Na_2B_4O_7$—$H_3BO_3$—$H_2O$ at 35° C., the ordinates representing the mols of $H_3BO_3$ per thousand mols of water present and the abscissa the mols of $Na_2B_4O_7$ per thousand mols of water present.
Figure 3:
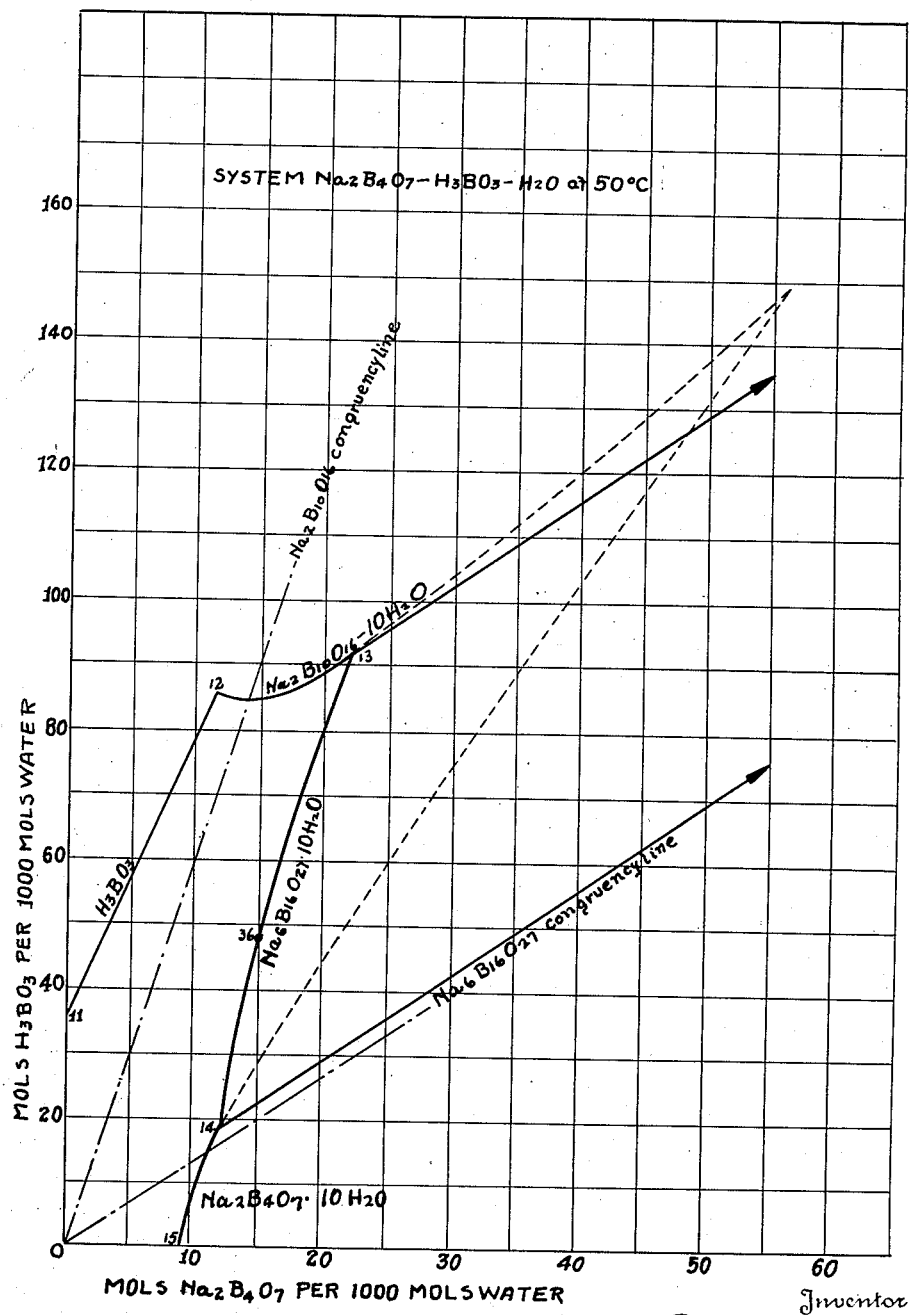

Figure 3 is a solubility diagram of the system $Na_2B_4O_7$—$H_3BO_3$—$H_2O$, similar to that of Figure 1, except that it represents the solubilities at 50° C.

Figure 2:
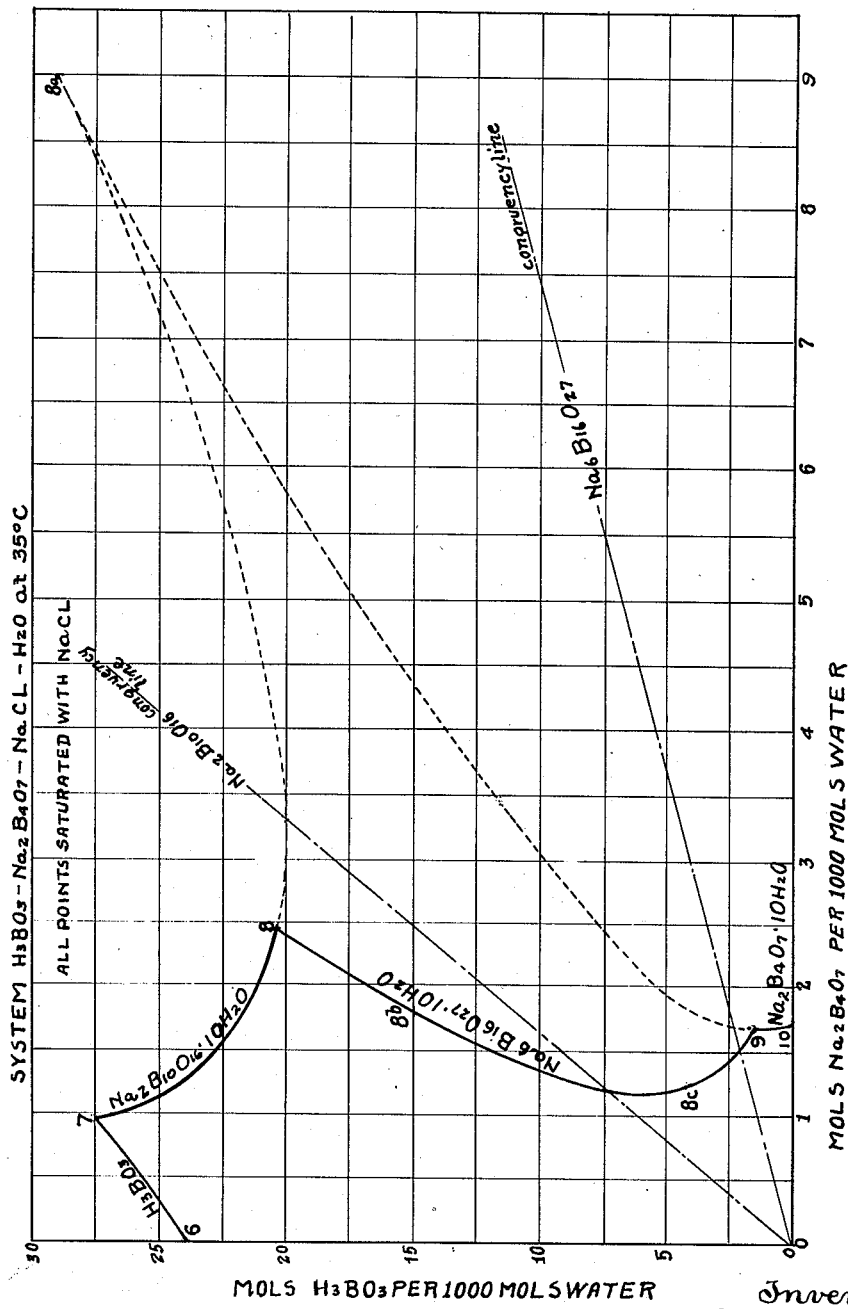
Figure 2 is a similar solubility diagram at 35° C., in which the solution at all points is saturated with sodium chloride, so that the system includes the ingredients $$Na_2B_4O_7—H_3BO_3—NaCl—H_2O$$
Figure 4:
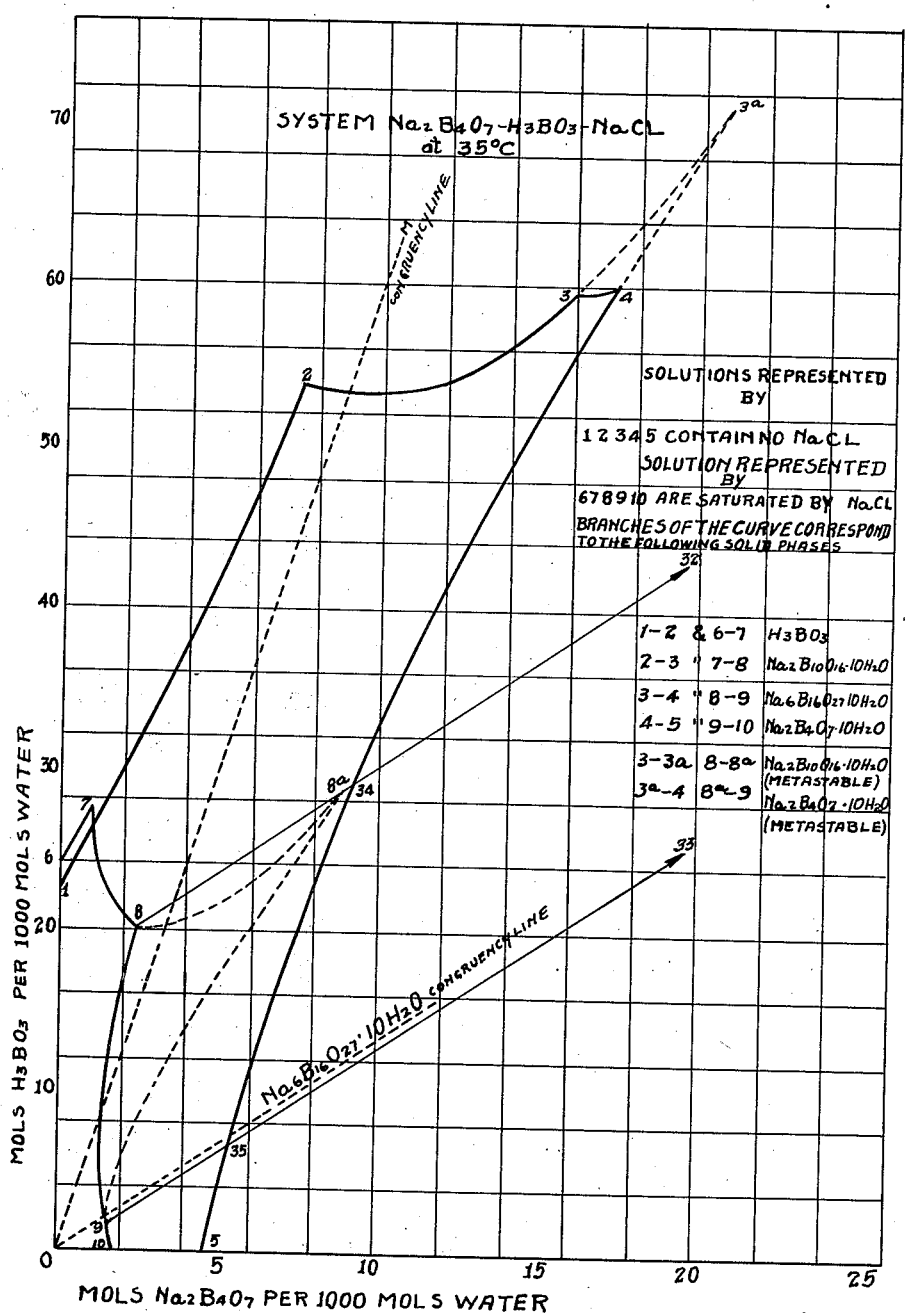

Figure 4 is a graph upon which are superimposed both the solubility diagram, shown in Figure 1, and the solubility diagram of Figure 2 plotted against the same co-ordinate axes so as to represent graphically the solubility changes induced by saturating the solution with sodium chloride.

The process of preparing my new borate compound may best be understood by reference to the solubility diagram of the system $$Na_2O—B_2O_3—H_2O$$

at some temperature at which said compound is stable.

To this end, I have shown the solubility diagram of the system $Na_2B_4O_7$—$H_3BO_3$—$H_2O$ at 35° C. in Figure 1. In a diagram of this nature, the curves represent the compositions of saturated solutions of all compounds or mixtures of compounds preparable from boric oxide and sodium oxide between and including the compounds sodium tetraborate and boric acid. The composition of every saturated solution between one of the tetraborate and one of boric acid which may be produced from sodium oxide, boric oxide and water, can also be produced from sodium tetraborate, boric acid and water, and all of these solutions at 35° C. are located on the curve 1—2—3—4—5 of Figure 1. The various peaks or breaks in the curve represent the points at which a change occurs in the solid phase which separates upon concentration. Thus, from 1 to 2, boric acid may be caused to crystallize by concentrating any solution having a composition lying along the curve 1—2, while from 2 to 3 sodium pentaborate decahydrate is the solid phase which crystallizes out. Likewise, from 4 to 5 sodium tetraborate decahydrate or borax is the crystallizing solid phase. It will not always be possible to crystallize a solid phase indefinitely from a given solution by concentration as the crystallization of the solid phase may cause such a change in the composition of the remaining solution as will cause a new solid phase to appear upon further concentration.

As previously noted, the curves 1—2—3—4—5 represent all saturated solutions which can be prepared from sodium tetraborate, boric acid and water. The solutions represented by all points outside of the curves 1—2—3—4—5 are either supersaturated solutions or sludges while those inside the curves are unsaturated solutions. On the several figures of the drawings there have been plotted certain lines which are designated as the congruency lines for various compounds on the solubility diagram. These congruency lines might also be called composition lines. For instance, the compound $Na_6B_{16}O_{27}$ may be considered as consisting of 3 mols of $Na_2B_4O_7$ and 4 mols of $H_3BO_3$. More correctly, as 3 mols of $Na_2B_4O_7$ and 2 mols of $B_2O_3$. Referring now to Figure 2, if a mixture of ¾ mol. of $Na_2B_4O_7$ and 1 mol. of $H_3BO_3$ were placed in water (in say, 1,000 mols of water), the composition of the resulting unsaturated solution would lie along the line marked "congruency line" (of $Na_6B_{16}O_{27}$) on said figure. If a further small quantity of the mixture which contained $Na_2O$ and $B_2O_3$ in the ratio of 3:8 (i. e. $3Na_2B_4O_7:4H_3BO_3$) were added to the solution, the composition upon analysis would be found to lie further to the right, along the line marked "congruency line". With this example, it becomes apparent that the congruency line might also be called the composition line. As a matter of interest in the specific case of Figure 2, the composition of the solution would continue to progress along the so-called congruency or composition line, upon addition of further small quantities of the compound $Na_6B_{16}O_{27}$, or mixtures of $Na_2O$ and $B_2O_3$ in the ratio of 3:8, until said composition intersected the curve 8—9, at which point the solution would be saturated congruently, with the compound $$Na_6B_{16}O_{27}.10H_2O$$

Further additions of the compound $$Na_6B_{16}O_{27}.10H_2O$$

would not change the composition of the solution. However, if the total mixture were analyzed, i. e., the solid material and the liquid (commonly called sludge), its composition would be found to lie further to the right along the so-called composition or congruency line. The termination of this congruency line is fixed by the composition of the salt itself, i. e. of $Na_6B_{16}O_{27}.10H_2O$. If we consider a quantity of said compound, for example, 250 gram mols of $Na_6B_{16}O_{27}.10H_2O$, this weight of material may be expressed in the following terms:

| | Mols |
|---|---|
| $H_3BO_3$ | 1,000 |
| $Na_2B_4O_7$ | 750 |
| $H_2O$ | 1,000 |

If this composition were plotted on a diagram, similar to Figures 1, 3 or 4, and this point connected with the origin "O" by a straight line, the congruency line would be immediately fixed and determined. The final point just referred to, i. e. the right-hand termination of this line, is also known as the "crystallization starting point" of the compound in question, which in this case is $Na_6B_{15}O_{16}.10H_2O$.

The importance of the congruency line is readily understood when the congruency line is considered in connection with Figure 1. In this instance, the system $H_3BO_3$—$Na_2B_4O_7$—$H_2O$, free of sodium chloride is plotted. Now, if we go back and retrace the former explanation, we find an entirely different condition, than the one just explained for the system saturated at 35° C. with sodium chloride (Figure 2). As a small quantity of compound $Na_6B_{16}O_{27}$ is placed in the solution, the composition of the solution so produced will progress out from the origin "O" along the $Na_6B_{16}O_{27}$ congruency line until the concentration becomes sufficiently great to intersect the solid curve 4—5. However, unlike the previous example, further addition of the compound will not result in the composition of the solution itself remaining constant. On the contrary, the added compound $Na_6B_{16}O_{27}.10H_2O$ will immediately start to decompose, and part of its constituents will go into solution while the remaining part will precipitate,—not as $Na_6B_{16}O_{27}.10H_2O$, but as common borax $Na_2B_4O_7.10H_2O$. If we continue to add the compound $Na_6B_{16}O_{27}.10H_2O$, the composition of the solution will progress along the curve 5—4 in the direction of point 4, becoming itself enriched in $H_3BO_3$ and precipitating a huge crop of $Na_2B_4O_7.10H_2O$. This is another way of saying that the compound $Na_6B_{16}O_{27}.10H_2O$ is not stable or congruent with its own solution in the absence of sodium chloride at 35° C. In other words, if this new compound at such a temperature is treated with water it decomposes, precipitating borax and forming a solution of high boric acid content. It is not until this decomposition has proceeded to the extent that the solution contains over 60 mols of $H_3BO_3$ and something over 17 mols of $Na_2B_4O_7$ that this decomposition will cease. When this condition has been reached, the solution will have reached point 4 of Figure 1, which is saturated with the new compound and at the same time with borax.

The corollary of the foregoing is evident; namely, that if a solution is made up to contain $Na_2O$ and $B_2O_3$ in the ratio of 3:8 and this solution cooled to, or concentrated at, 35° C., the compound $Na_6B_{16}O_{27}.10H_2O$ will not be precipitated; but, on the contrary, the precipitate will consist only of common borax ($Na_2B_4O_7.10H_2O$). The only way in which the new compound can be prepared at 35° C. in the absence of sodium chloride is by causing it to precipitate from a solution which does not have the composition of $3Na_2O:8B_2O_3$, but rather from a solution which has the composition expressed by points along the curve 3—4, the midpoint of which has (for example) the ratio of $3Na_2O:11.3B_2O_3$.

In many cases it is desired to know what compound will crystallize from a given solution, in what quantity and what the composition of the remaining mother liquor will be. Data of this nature can be determined from a set of curves of this type. If the solution is a saturated one, it will, of course, lie directly on the curve and crystallization can be effected therefrom by concentrating the solution. As a result of such concentration, the composition of the remaining solution will move along the curve away from the intersection of said curve with the congruency line of the crystallizing compound until a break in the curve is reached; such a point will represent a point at which the solution becomes saturated with an additional solid phase and this solid phase will begin to crystallize. If this peak or break in the curve is between the congruency lines for the two compounds with which the solution is then saturated, further concentration under equilibrium conditions will not cause any change in the composition of the solution. It will therefore remain constant and there will be precipitated a mixture composed of the two compounds in proportions to give a composition corresponding to that of the solution. If this peak or break is outside of the area defined by the two congruency lines, further concentration will cause the composition of the solution to move along the branch of the curve representing the second compound and that compound alone will be the crystallizing solid phase. Thus, in Figure 1, if a solution lying on the curve 2—3 between the intersection of the congruency line for $Na_2B_{10}O_{16}.10H_2O$ and the point 3 is concentrated isothermally, crystallization of $Na_2B_{10}O_{16}.10H_2O$ will result until the mother liquor composition reaches the point 3. At that point the solution is saturated with $Na_2B_{10}O_{16}.10H_2O$ and $Na_6B_{16}O_{27}.10H_2O$. Since the point 3 is between the congruency line for the latter compound and that for

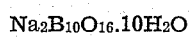

$Na_2B_{10}O_{16}.10H_2O$ further isothermal concentration will cause the precipitation of a constant composition mixture of the two compounds in those proportions in which they exist in the solution. No change in the composition of the solution will occur under equilibrium conditions. If, however, a solution lying on the upper portion of the curve 4—5 is concentrated, crystallization of $Na_2B_4O_7.10H_2O$ takes place, and the composition of the mother liquor proceeds along the curve 4—5 until the point 4 is reached. At that point the solution becomes saturated with $Na_6B_{16}O_{27}.10H_2O$. Since this point is on the same side of both the congruency line for $Na_6B_{16}O_{27}.10H_2O$ and that for $Na_2B_4O_7.10H_2O$, this point is not an end point of crystallization. Further concentration thus will cause the deposition of $Na_6B_{16}O_{27}.10H_2O$ only, and the composition of the solution will proceed along the curve 3—4 until the point 3 is reached. As already noted this latter point is an end point of crystallization.

If the solution is an unsaturated one, concentration thereof will cause the composition to move outward along a line passing through the origin "0" and the point representing the composition of the solution. Crystallization can be effected as soon as sufficient concentration has taken place to cause the solution to become saturated. Crystallization from a solution so concentrated will proceed as described in the preceding paragraph.

When the solution is a supersaturated one or is a sludge of one or more metastable solid phases, crystallization can be immediately effected by seeding with the stable solid phase and agitating or in some cases by agitating alone. The crystallization path will be along the line drawn through the point representing the composition of the solution or mixture and the point representing the composition of the crystallizing stable phase. Thus, for example, referring to Figure 4, if the compound $Na_6B_{16}O_{27}.10H_2O$ is the stable solid phase, the crystallization path will be along a line drawn through the point representing the composition of the solution or mixture and a point representing 1000 mols of $H_3BO_3$ and 750 mols of $Na_2B_4O_7$ per 1000 mols of water, which is a point considerably beyond the limits of the plots shown. Since a given phase is the stable solid phase only so long as the path of crystallization intersects the portion of the curve for which that compound is the stable solid phase, the field which includes all solutions and/or mixtures from which a compound can be crystallized is defined by lines drawn through the terminal points of that section of the curve for which the desired compound is the stable solid phase and the crystallization starting point for that compound.

Referring to Figure 4, this field for the compound $Na_6B_{16}O_{27}.10H_2O$ is partially defined by the lines 8—32 and 9—33, which are portions of the lines drawn between the terminal points 8 and 9 of the curve 8—9 and the crystallization starting point for $Na_6B_{16}O_{27}.10H_2O$. All solutions or sludges lying in the area to the right of the curve 8—9 and between the lines 8—32 and 9—33 will deposit $Na_6B_{16}O_{27}.10H_2O$ upon crystallization, when the final solution, at 35° C., is saturated with respect to NaCl. In some cases, there also exist one or more metastable phases which may crystallize from a given solution if stable equilibrium is not attained. This is true in the case of $Na_6B_{16}O_{27}.10H_2O$, sodium pentaborate decahydrate and sodium tetraborate decahydrate being metastable solid phases within the field for which $Na_6B_{16}O_{27}.10H_2O$ is the stable solid phase. In such cases, if a metastable phase does crystallize, it will become converted to the stable phase merely by agitation for a sufficient period of time.

Prior to the discovery of my new compound, the solubility curve for this system at 35° C. was believed to extend to the point 3ª, as shown in dotted lines on Figure 1. Otherwise stated, the sodium pentaborate field was believed to extend from 2 to 3ª and the sodium tetraborate field from 3ª to 5. I have found, however, that sodium pentaborate and sodium tetraborate exist only in a metastable condition from 3 to 3ª and 3ª to 4, respectively. Actually, there exists in this system at this and higher temperatures a new stable compound which has the formula $3Na_2O.8B_2O_3.10H_2O$ i. e. $Na_6B_{16}O_{27}.10H_2O$. This new compound is stable in contact with all solutions existing along the branch of the curve 3—4 at 35° C.

The preparation of my new compound requires special precautions and procedure because it is not congruent with its own solution at all temperatures. This is readily apparent from Figure 1, which shows the congruency line for $Na_6B_{16}O_{27}$,  it being apparent that this line does not cross the curve 3—4 representing the solutions with which $Na_6B_{16}O_{27}.10H_2O$ is stable, at any point. I have also found that this new compound crystallizes only very slowly at 35° C. In cases of this nature, where a desired compound is not congruent with its own solution, it is the usual practice to prepare the compound by crystallizing it from a solution with which it is stable. In the present case, for example, the new compound $Na_6B_{16}O_{27}$ can be prepared by first preparing a solution having a composition on the curve 3—4 and then cooling or concentrating this solution. With this method, however, only very small amounts of the new compound can be obtained as the range of compositions of solutions with which the new compound is stable is very limited in pure solutions at 35° C. Also, the tendency for the compound to crystallize is so small that the compound is attainable only with extreme difficulty at this temperature by ordinary or usual methods from solutions free from extraneous substances, such as NaCl.

To overcome these difficulties and provide successful procedure for preparing my new compound is one of the objects of this invention. This object has been accomplished in accordance with this invention in a number of ways, based upon certain fundamental discoveries which I have made. I have found that the solubility of the new compound is decreased and the range of solution compositions with which it is stable is increased by the presence of sodium chloride. I have also found that the field of the new compound is greater at higher temperatures. Based upon these discoveries, I prefer to prepare the new compound by causing it to crystallize from a solution which is saturated with sodium chloride or which is at a temperature above 35° C., or which satisfies both of these conditions.

The effect of the presence of sodium chloride is evident from Figure 4, which shows the solubility diagram for the system $$Na_2B_4O_7-H_3BO_3-NaCl-H_2O$$

at 35° C. with all points saturated with sodium chloride superimposed on the diagram for the chloride free system $Na_2B_4O_7-H_3BO_3-H_2O$ at the same temperature. It will be noted that the solubilities of all phases in the system are appreciably reduced by the presence of sodium chloride. The greatest effect of the presence of sodium chloride, however, is the large increase in the length of the curve for which $Na_6B_{16}O_{27}.10H_2O$ is the stable solid phase and the attendant decrease in the length of the $Na_2B_4O_7.10H_2O$ portion of the curve. The increase in the $Na_6B_{16}O_{27}.10H_2O$ field is so great that this compound is now congruent with its own solution when saturated with NaCl. As in the case of the diagram of Figure 1, the dotted lines from 8 to 8ª and from 8ª to 9 represent the diagram as it was believed to exist prior to the discovery of my new compound. Likewise, sodium pentaborate and sodium tetraborate are metastable along the curve 8—8ª—9. The increase in the range of solutions with which the compound $Na_6B_{16}O_{27}.10H_2O$ is stable is apparent from the increased length of the curve 8—9 over the curve 3—4 of Figure 1. This is especially noticeable from the superimposed curves of Figure 4.

All points are saturated with NaCl in the curve of Figure 2 but this component is not plotted. The NaCl saturation values corresponding with the several points on this curve are approximately as follows:

| Stable solid phases | $Na_2Cl_2$ in mols/1000 mols $H_2O$ | |
|---|---|---|
| NaCl, $H_3BO_3$ (point 6) | 56.6 | |
| NaCl, $H_3BO_3 Na_2B_{10}O_{16}.10H_2O$ (point 7) | 55.8 | |
| NaCl, $Na_2B_{10}O_{16}.10H_2O$, $Na_6B_{16}O_{27}.10H_2O$ | 55.7 | (Point 8). |
| NaCl, $Na_6B_{16}O_{27}.10H_2O$ (point 8ᵇ) | 54.7 | |
| NaCl, $Na_6B_{16}O_{27}.10H_2O$ (point 8ᶜ) | 54.4 | |
| NaCl, $Na_6B_{16}O_{27}.10H_2O$, $Na_2B_4O_7.10H_2O$ | 55.1 | (Point 9). |
| NaCl, $Na_2B_4O_7.10H_2O$ (point 10) | 54.0 | |

The effect of temperature on the solubility of the other solid phases is quite marked, whereas the solubility of the new compound does not change greatly with change of temperature. Therefore at 50° C., as shown in Figure 3, the field of the new compound has greatly expanded in size over that of the 35° isotherm due to the greatly increased solubilities of the adjacent compounds $Na_2B_{10}O_{16}.10H_2O$ and $Na_2B_4O_7.10H_2O$. However, the compound $Na_6B_{16}O_{27}.10H_2O$ is not congruent with its own solution at 50° C., though it becomes so at a slightly higher temperature and remains so at higher temperatures. There is an additional effect of temperature on the formation of the new compound which is not apparent from the solubility diagram, namely, the effect on the rate of crystal formation and crystal growth. At lower temperatures, crystals of $Na_6B_{16}O_{27}.10H_2O$ grow quite slowly, but by raising the temperature to 50° C. or higher, I find that the rate of crystal growth is increased and consequently crystal growth at higher temperatures is improved.

The preparation of this new compound in pure form is additionally complicated by the fact that sodium pentaborate decahydrate and sodium tetraborate decahydrate tend to separate as metastable solid phases from a large range of solutions from which $Na_6B_{16}O_{27}.10H_2O$ should ultimately crystallize as the stable solid phase. The solubilities of these metastable solid phases change greatly with temperature, as stated above. For this reason, I have found it desirable to effect a rapid separation of the mother liquor from the crystals of $Na_6B_{16}O_{27}.10H_2O$ when the preparation thereof has been accomplished at temperatures above atmospheric. If the separation is not sufficiently rapid, cooling and evaporation of the mother liquor may occur and there exists a fairly positive tendency for either sodium pentaborate or sodium tetraborate to crystallize therefrom. This is increased by the great tendency for the new compound $Na_6B_{16}O_{27}.10H_2O$ to supersaturate. This tendency is so pronounced that complete equilibrium, i. e. release of supersaturation, is difficult to obtain. As a consequence, the mother liquors at higher temperatures often tend to be very viscous due to the high content of dissolved salts resulting from the high solubilities of the metastable compounds and supersaturation of my new compound. Such viscous liquors are difficult to separate from the crystals of $Na_6B_{16}O_{27}.10H_2O$. To overcome this difficulty, I accomplish the separation of the crystals and mother liquor when the production has been executed at higher temperatures by rapidly introducing a large quantity of cold water into the mixture of mother liquor and crystals and then filtering or otherwise separating the crystals from the liquor. By employing a sufficient quantity of added water, saturation with the metastable phases, sodium pentaborate decahydrate and sodium tetraborate decahydrate upon cooling is prevented, and it is possible to separate the crystals of $Na_6B_{16}O_{27}.10H_2O$ in substantially pure form. Cold water is preferably employed as the rate of solution of the compound $Na_6B_{16}O_{27}.10H_2O$ is much less at lower temperatures.

A number of methods of preparing the new compound will be evident from the discussion given heretofore, but one which I have found especially satisfactory involves crystallization at an elevated temperature. As has been noted in connection with the diagram of Figure 3, the new compound becomes congruent with its solution at some temperature slightly higher than 50° C. and remains so at higher temperatures. Crystallization at higher temperatures, therefore, permits the use of solutions containing $Na_2O$ and $B_2O_3$ in the ratio in which they exist in the desired compound, i. e. the ratio $$Na_2O : B_2O_3 = 3 : 8$$

I, therefore, dissolve boric acid and a free sodium oxide containing compound in such proportions that there is produced a concentrated solution containing $Na_2O$ and $B_2O_3$ in the molecular ratio of 3:8. Any free sodium oxide containing compound may be employed, but I find it preferable to employ one which does not introduce additional elements or radicals. Thus, sodium hydroxide and the sodium compounds of boric acid have been found satisfactory. Sodium carbonate may also be used. If a sodium borate containing a greater ratio of $B_2O_3$ to $Na_2O$ than 8:3 is employed, it will be necessary to add further free $Na_2O$ thereto in place of the boric acid. The solution so prepared is then concentrated, preferably by boiling, to cause crystallization of $Na_6B_{16}O_{27}.10H_2O$. Heating of the solution to cause concentration and precipitation of $Na_6B_{16}O_{27}.10H_2O$ is desirable as the tendency for crystallization of $Na_6B_{16}O_{27}.10H_2O$ is appreciably greater at higher temperatures. At low temperatures, as in the neighborhood of 35° C., this new compound is very slow to crystallize from solution, but as the temperature increases, the tendency for it to crystallize increases appreciably. When the temperature is maintained in the neighborhood of 100° C., the compound crystallizes fairly readily and no special precautions to facilitate its crystallization are required. The crystals may be separated from the mother liquor continuously as they form if it is convenient to effect this separation in the hot liquid, but it will usually be found desirable to effect the separation after the crystallization is complete. After the greater part of the solute has crystallized as $Na_6B_{16}O_{27}.10H_2O$, the mixture of crystals and mother liquor is removed from the source of heat and a large quantity of cold water added quickly to thereby dilute the mother liquor. Cold water is preferably added as the new compound dissolves much less rapidly cold than hot. The quantity of water added should be sufficient to undersaturate the solution with the metastable solid phase, sodium tetraborate decahydrate. Since this compound $(Na_2B_4O_7.10H_2O)$ will tend to form from a solution of the new compound itself, either as a metastable or stable solid phase, depending upon whether the temperature is above or below that at which the new compound becomes congruent, re-crystallization can not be depended upon to eliminate any contamination therewith. It is thus essential that every precaution possible should be taken to prevent precipitation of a metastable phase.

Mention has already been made of the fact that another sodium borate compound, $$Na_4B_{10}O_{17}.5H_2O$$

has been reported in the prior art literature. This compound has not been shown on the equilibrium diagrams of Figures 1, 2, 3, and 4 because it has not been known to form at temperatures below the boiling point of water. This compound, $Na_4B_{10}O_{17}.5H_2O$, has been prepared by M. V. Auger (Comptes Rendu 180, p. 1603) by heating a solution containing sodium oxide and boric oxide in the ratio of 2:5 or 1:2.5. I have found that my new compound $Na_6B_{10}O_{27}.10H_2O$ may be prepared by boiling a solution containing $Na_2O$ and $B_2O_3$ in a ratio of 3:8 or 1:2.67. Since the ratio for my compound is so close to that for the compound $Na_4B_{10}O_{17}.5H_2O$, seeding with this latter compound should be prevented when it is desired to crystallize $Na_6B_{16}O_{27}.10H_2O$ at or near the boiling point as it is likely that $$Na_4B_{10}O_{17}.5H_2O$$

would crystallize if seeding therewith takes place.

As an example of this method of procedure, I dissolve 100 grams of borax, $Na_2B_4O_7.10H_2O$ and 21.6 grams of boric acid, $H_3BO_3$ in 100 grams of water, and boil the resulting solution until the greater part of the dissolved constituents have crystallized as $Na_6B_{16}O_{27}.10H_2O$. The mother liquor will have become quite viscous and crystallization is preferably discontinued when a small amount of mother liquor remains. Approximately, 100 cc. of cold water is quickly added and the crystals separated from the solution as quickly as possible to prevent re-solution of the crystals.

This method above described utilizes the effect of temperature to secure the desired crystallization of the compound, and I have found that such a method is satisfactory. If, however, it is desired for any reason to operate at lower temperatures, I have devised a further method which utilizes the effect of the presence of sodium chloride to facilitate the desired crystallization. A solution having a composition lying on the portion of the curve 4—5 of Figure 4 between the points 34 and 35 is prepared and sufficient sodium chloride added to not quite saturate the solution therewith when it has reached equilibrium at 35° C. The amount of sodium chloride added must allow for concentration due to the removal of water of crystallization of $Na_6B_{16}O_{27}.10H_2O$ upon crystallization thereof. This solution is then agitated preferably with the addition of seeds of $Na_6B_{16}O_{27}.10H_2O$. Due to the removal of water of crystallization with the $Na_6B_{16}O_{27}.10H_2O$, the solution will undergo concentration and maintain a state of supersaturation with respect to $Na_6B_{16}O_{27}.10H_2O$ until equilibrium is reached. Since 35° C. is not greatly above room temperature, contamination with metastable phases as a result of cooling is not very likely to occur. After crystallization of $Na_6B_{16}O_{27}.10H_2O$ has proceeded to the point where the composition of the mother liquor falls within the area bounded by the curves 8—8a—9, the solution becomes unsaturated with these metastable phases and their crystallization can no longer occur. In fact, they will tend to re-dissolve, if already present. For this reason, I prefer to agitate the mixture of crystals and mother liquor for an hour or so after crystallization has apparently ceased, in order to re-dissolve any metastable phases which may have separated in the early stages of crystallization. Contamination with sodium chloride, except that contained in adhering mother liquor, is also avoided by holding the NaCl concentration below that value which represents saturation therewith at the end point or equilibrium point of the crystallization reaction.

The curves of Figure 4 are the solubility curves 1—2—3—4—5 of Figure 1 for the system $Na_2B_4O_7$—$H_3BO_3$—$H_2O$ at 35° and 6—7—8—8—10 of Figure 2 for the system $$Na_2B_4O_7 — H_3BO_3 — NaCl — H_2O$$

at 35°. From the superimposed curves the magnitude of the effects caused by NaCl in the system $Na_2B_4O_7$—$H_3BO_3$—$H_2O$ becomes more readily apparent. Also plotted on the graph of this Figure 4 are the lines drawn between the terminals 8 and 9 of the $Na_6B_{16}O_{27}.10H_2O$ portion of the curve and the crystallization starting point for that compound. The lines 8—32 and 9—33 are portions of these lines, and they define the field within which lie all solutions or sludges from which $Na_6B_{16}O_{27}.10H_2O$ can be crystallized in pure form when sufficient NaCl is present to substantially saturate the mother liquor. The crystallization path for any given solution in this field will be the extension of a straight line drawn through the crystallization starting point and the point representing the composition of the initial solution from which crystallization is to be effected. The intersection of this line with the curve 8—9 is the composition of the mother liquor if no concentration or dissolution has taken place.

An example of the method last given, which is based upon the addition of sodium chloride to a saturated solution to cause crystallization of $Na_6B_{16}O_{27}.10H_2O$ will be explained in connection with the curves of Figure 4. As previously set forth, any saturated solution which upon addition of sodium chloride will crystallize $Na_6B_{16}O_{27}.10H_2O$ and give a mother liquor having a composition somewhere on the curve 8—9 of Figure 2 or Figure 4 can be employed in this process. Consequently, any solution of $Na_2B_4O_7$ and $H_3BO_3$ in water lying between the lines 8—32 and 9—33 and between the curves 8—9 and 4—5 will yield $Na_6B_{16}O_{27}.10H_2O$ when sufficient sodium chloride is added to substantially saturate the mother liquor. The yield will vary directly with the distance between the solution composition point and the curve 8—9 along the crystallization path. Consequently, the greatest yields will be obtained by starting with a solution near the intersection 34 of the line 8—32 and the curve 4—5. Such a solution is one containing 9.1 mols of $Na_2B_4O_7$ and 28.6 mols of $H_3BO_3$ in 1000 mols of $H_2O$. When such a solution is treated with 53–54 mols of $Na_2Cl_2$ at 35°, pure $Na_6B_{16}O_{27}.10H_2O$ will be deposited when equilibrium is reached. At the start of crystallization a metastable phase of either sodium pentaborate decahydrate or sodium tetraborate decahydrate may crystallize in addition to $Na_6B_{16}O_{27}.10H_2O$, but when equilibrium is reached any metastable phase so crystallized will have become converted to the desired compound $Na_6B_{16}O_{27}.10H_2O$. For this reason, it is desirable that sufficient time be allowed to permit equilibrium to become established. From the starting solution used in the above example approximately 15.6 mols of $Na_6B_{16}O_{27}.10H_2O$ are obtainable.

While this method of procedure has been described in connection with curves at 35° C., it is equally applicable at any temperature at which the desired compound, $Na_6B_{16}O_{27}.10H_2O$, has a field of stability. The method of procedure is the same at any such temperature and the compositions of solutions required can be readily determined from the solubility curve at the desired temperature.

Since the congruency line for the new compound intersects the field of stability thereof in the system containing sodium chloride at saturation, as shown by the diagram of Figure 2, the second or "cold" method of preparation may be employed by starting with a solution made up of stoichiometric quantities of boron oxide and sodium oxide and containing just enough sodium chloride to substantially saturate the mother liquor therewith. The quantities of sodium tetraborate, boric acid and water required to make up such a solution are shown by the coordinates of the point of intersection of the $Na_6B_{16}O_{27}.10H_2O$ congruency line with the curve 4—5 of Figure 1. Such a solution would be composed of 5.5 mols of sodium tetraborate decahydrate and 7.2 mols of boric acid. The NaCl required to saturate the mother liquor is between 53 and 54 mols of $Na_2Cl_2$ in 1000 mols of water. As in the case of the previous example, crystallization of $Na_6B_{16}O_{27}.10H_2O$ from such a solution will start upon addition of the sodium chloride and will continue until equilibrium is reached and any precipitated metastable phase is converted to $Na_6B_{16}O_{27}.10H_2O$.

It is also possible to produce my new borate compound by a solid reaction or conversion when a sludge composed of stoichiometric quantities of borax and boric acid with insufficient water to dissolve all of the solids reacting is agitated at temperatures above about 51° C. The speed of reaction or conversion is appreciably greater at higher temperatures. Contamination with a metastable solid phase upon rapid cooling of the mixture of crystals and mother liquor must be avoided in this reaction as in the case of the high temperature process described above. Contaminations of this nature may be conveniently prevented by adding excess cold water upon completion of the reaction to sufficiently dilute the mother liquor.

All of the methods heretofore set forth are substantially batch processes and consequently the production thereby may be considered limited. A continuous method of producing my compound comprises adding $Na_2O$, $B_2O_3$ and $H_2O$ in suitable form in the proportions in which they exist in $Na_6B_{16}O_{27}.10H_2O$ to a solution in contact with which the compound is stable and agitating the resultant sludge while maintaining the temperature substantially constant in the neighborhood of the temperature at which $Na_6B_{16}O_{27}.10H_2O$ is stable in contact with the starting solution. In this method, $Na_2O$, $B_2O_3$ and $H_2O$ are added continuously until the desired quantity of the new compound is produced. It is necessary, however, that equilibrium be essentially established as one of the metastable solid phases, $Na_2B_4O_7.10H_2O$ or $Na_2B_{10}O_{16}.10H_2O$ may be precipitated and remain unconverted. Referring to Figure 4, production of the new compound by this process is accomplished by taking a solution represented by any point on the curve 8—9 or 3—4, preferably near the center thereof, adding $Na_2O$, $B_2O_3$, and $H_2O$ thereto in the proportion in which they exist in $Na_6B_{16}O_{27}.10H_2O$ and agitating while maintaining the temperature at about 35° C. This method is particularly applicable when operating at higher temperatures as the rate of crystal growth of $Na_6B_{16}O_{27}.10H_2O$ is considerably greater at higher temperatures. Various free sodium oxide and boron oxide containing materials may be used in such a process. For example, borax and boric acid may be dissolved in water to form the original or basic solution, sodium chloride being added to saturate the same if it is desired to operate in the field of the curve 8—9 of Figure 4 or other sodium borates together with an acid or an alkali may be used in equivalent amounts of Na₂O and B₂O₃. A solution containing 15 mols of Na₂O, 54.5 mols of B₂O₃ and 1073 mols of water, which corresponds with the point 36 on curve 13—14 of Figure 3 may be obtained by dissolving 49 mols of H₃BO₃ and 15 mols of Na₂B₄O₇ in 1000 mols of H₂O.

In producing Na₆B₁₆O₂₇.10H₂O from this basic solution by the addition of Na₂O, B₂O₃ and H₂O thereto it is essential that these ingredients be added substantially in the proportions in which they exist in Na₆B₁₆O₂₇.10H₂O, so that the composition of the solution remains substantially constant. Fluctuations in the amount of water added are permissible so long as the composition of the mother liquor remains within the field from which Na₆B₁₆O₂₇.10H₂O will crystallize. If concentration occurs, for example, the composition of the mixture will move away from the origin O of the curve and such concentration must be limited so that the solution composition does not reach a point outside of the field defined by a line drawn through the point 13 and the Na₆B₁₆O₂₇.10H₂O crystallization starting point. When dilution occurs, the solution, of course, becomes unsaturated and Na₆B₁₆O₂₇.10H₂O already crystallized will be re-dissolved until saturation is again reached. If the operation is carried out under conditions such that Na₆B₁₆O₂₇.10H₂O is congruent with its solution, then continued dilution can only cause continued resolution of the Na₆B₁₆O₂₇.10H₂O, but can not cause precipitation of any other phase. If congruency will not occur, dilution must be controlled so that resolution of crystallized Na₆B₁₆O₂₇.10H₂O will always produce a solution at or about the transition point between sodium tetraborate decahydrate and the new compound.

The proportion of water, sodium oxide containing component and boric oxide containing component required to produce the new compound from a given basic solution can be determined from the equation representing the reaction which occurs to produce said compound. For the use of borax and boric acid, the equation is:

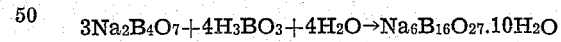

It is thus apparent that four mols of water must be added to produce one mol. of Na₆B₁₆O₂₇.10H₂O when anhydrous borax and boric acid are used. If hydrated borax is employed, the quantity of water added is decreased in accordance with the degree of hydration of the borax. When more water is added as water of hydration of the borax than enters into the reaction, concentration of the solution, such as by evaporation, should be effected to maintain the composition of the solution within the Na₆B₁₆O₂₇.10H₂O field. It is also possible to reduce the amount of concentration required when using hydrated borax by employing metaboric acid, HBO₂, in place of boric acid. The reaction then is as follows:

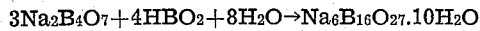

There is thus twice as much free water necessary with HBO₂ as with H₃BO₃ and anhydrous borax. This may be supplied in the form of water of hydration by using partially calcined borax of the proper degree of hydration, or by using mixtures the components of which have different degrees of hydration.

This new borate compound has especial value in the glass and enamel industries. In recent years, it has become standard practice to employ small quantities of boron oxide in both glass and enamel batches, as this constituent has been found to impart improved qualities to the final products. Because borax is the most common commercial form of boron compounds, it has been largely used to supply the desired boron oxide component in glass and enamel batches. In many cases, however, the additional sodium oxide supplied as part of the borax added is undesirable, and for this reason where increased quantities of boron oxide are desired a mixture of borax and boric acid is employed. Because of its higher ratio of B₂O₃ to Na₂O my new compound is especially satisfactory for use in glass batches.

While the particular compound and method of preparing the same herein described are well adapted to accomplish the objects of the invention, various modifications and changes may be made, all coming within the scope of the appended claims.

What I claim is:

1. A new product comprising a sodium borate compound resulting from the crystallization from solution of a sodium borate with water of hydration, in which the ratio of Na₂O to B₂O₃ is substantially 3:8.

2. A new product comprising the hydrated sodium borate compound having a composition represented by the formula Na₆B₁₆O₂₇.10H₂O.

3. A new article of manufacture comprising a sodium borate compound containing Na₂O and B₂O₃ in the ratio of substantially 3:8 with water of crystallization.

4. The method of preparing a sodium borate composed of Na₂O and B₂O₃ in the ratio of about 3:8 which comprises preparing a solution containing Na₂O and B₂O₃ in their stoichiometric proportions in said sodium borate and essentially saturated with respect to sodium chloride, and concentrating said solution at a temperature above about 35° C.

5. The method of preparing the compound Na₆B₁₆O₂₇.10H₂O which comprises preparing a solution containing Na₂O and B₂O₃ in proportions to give a composition within the Na₆B₁₆O₂₇.10H₂O field, adding sodium chloride thereto in quantities at least as small as that quantity which will saturate the equilibrium mother liquor, and agitating the mixture to bring to equilibrium.

6. The method of preparing the compound Na₆B₁₆O₂₇.10H₂O which comprises preparing a solution containing Na₂O and B₂O₃ in proportions to give a composition on the Na₆B₁₆O₂₇.10H₂O solubility curve at any desired temperature, adding free sodium oxide and free boric oxide containing compounds and water simultaneously in such proportions that the Na₂O, B₂O₃ and water added are in the ratio of 3:8:10, and agitating to secure conversion to Na₆B₁₆O₂₇.10H₂O.

7. The method of preparing the compound Na₆B₁₆O₂₇.10H₂O which comprises preparing a solution containing Na₂O and B₂O₃ in proportions to give a saturated solution on the Na₆B₁₆O₂₇.10H₂O portion of the solubility curve for the system Na₂O—B₂O₃—H₂O or Na₂O—B₂O₃—NaCl—H₂O at any desired temperature, adding a mixture containing free Na₂O, free B₂O₃ in the proportions in which they exist in Na₆B₁₆O₂₇.10H₂O, controlling the water content of the reaction mixture so that the composition thereof remains in the Na₆B₁₆O₂₇.10H₂O field, maintaining the temperature substantially constant when operating at a temperature at which the desired compound is not congruent with its solution and agitating the reaction mixture to secure conversion to $Na_6B_{16}O_{27}.10H_2O$.

8. The method of preparing the compound $Na_6B_{16}O_{27}.10H_2O$ which comprises preparing a solution containing $Na_2O$ and $B_2O_3$ in proportions to give a saturated solution on the $Na_6B_{16}O_{27}.10H_2O$ portion of the solubility curve for the system $Na_2O$—$B_2O_3$—$H_2O$ or $Na_2O$—$B_2O_3$—$NaCl$—$H_2O$ at a temperature above the minimum temperature at which congruency of $Na_6B_{16}O_{27}.10H_2O$ with its solution occurs, adding a mixture containing free $Na_2O$, free $B_2O_3$ in the proportions in which they exist in $Na_6B_{16}O_{27}.10H_2O$, controlling the water content of the reaction mixture so that the composition thereof remains in the $Na_6B_{16}O_{27}.10H_2O$ field maintaining the temperature above the lowest temperature at which congruency of $$Na_6B_{16}O_{27}.10H_2O$$

with its solution occurs and agitating the reaction mixture to secure conversion to $Na_6B_{16}O_{27}.10H_2O$.

9. The method of preparing the compound $Na_6B_{16}O_{27}.10H_2O$ which comprises preparing a solution containing $Na_2O$ and $B_2O_3$ in proportions to give a saturated solution on the $Na_6B_{16}O_{27}.10H_2O$ portion of the solubility curve for the system $Na_2O$—$B_2O_3$—$H_2O$ or $Na_2O$—$B_2O_3$—$NaCl$—$H_2O$ at any desired temperature, adding a mixture containing free $Na_2O$, free $B_2O_3$ in the proportions in which they exist in $Na_6B_{16}O_{27}.10H_2O$, controlling the water content of the reaction mixture by controlling the hydration of the reaction components employed to supply the $Na_2O$ and $B_2O_3$ contents so that the composition thereof remains in the $Na_6B_{16}O_{27}.10H_2O$ field, maintaining the temperature substantially constant when operating at a temperature at which the desired compound is not congruent with its solution and agitating the reaction mixture to secure conversion to $$Na_6B_{16}O_{27}.10H_2O$$

10. The method of preparing a sodium borate composed of $Na_2O$ and $B_2O_3$ in the ratio of about 3:8 which comprises preparing a solution containing $Na_2O$ and $B_2O_3$ in their stoichiometric proportions in said sodium borate and concentrating said solution at a temperature above about 51° C.

11. The method of preparing the compound $Na_6B_{16}O_{27}.10H_2O$ which comprises adding sodium chloride to, and effecting crystallization of $Na_6B_{16}O_{27}.10H_2O$ from, a solution containing free $Na_2O$ and $B_2O_3$ in such proportions as will cause the composition of the final mother liquor to correspond to a point within the $Na_6B_{16}O_{27}.10H_2O$ field of stability as defined by the $$Na_2O—B_2O_3—NaCl—H_2O$$

solubility diagram at the desired temperature.

12. The method of preparing the compound $Na_6B_{16}O_{27}.10H_2O$, which comprises preparing a solution or mixture containing $Na_2O$, $B_2O_3$ and $H_2O$ in proportions to give a composition within the $Na_6B_{16}O_{27}.10H_2O$ field at a temperature above about 51° C. and crystallizing said compound from said solution or mixture at a temperature above about 51° C.

HENRY BRUNO SUHR.